June 18, 1963
W. C. HUGULEY
3,093,888
METHOD OF FABRICATING SMALL MOTOR ARMATURES
Filed Nov. 18, 1958
2 Sheets-Sheet 1
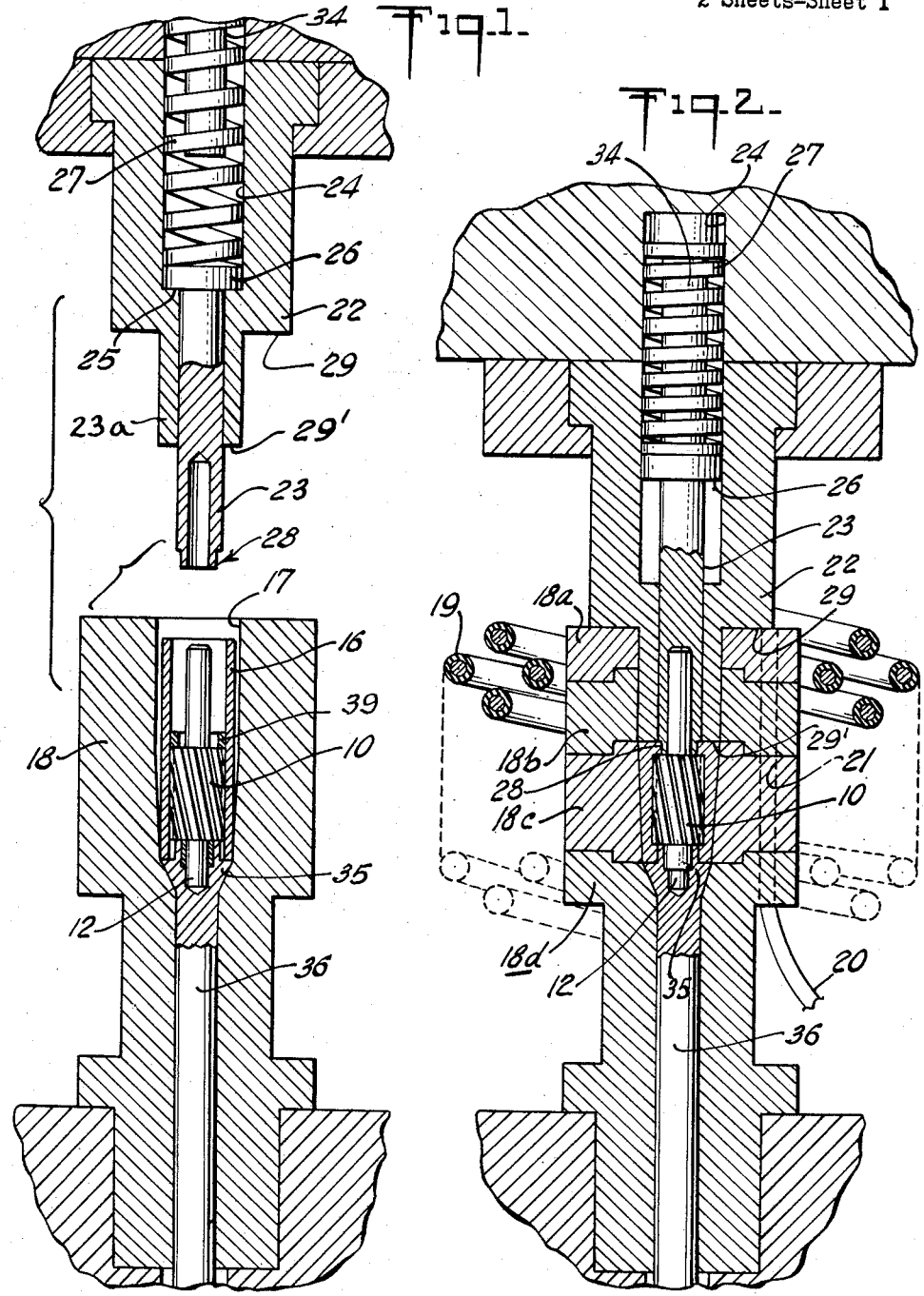
INVENTOR
WILLIAM C. HUGULEY
BY
ATTORNEY June 18, 1963 W. C. HUGULEY 3,093,888
METHOD OF FABRICATING SMALL MOTOR ARMATURES
Filed Nov. 18, 1958 2 Sheets-Sheet 2
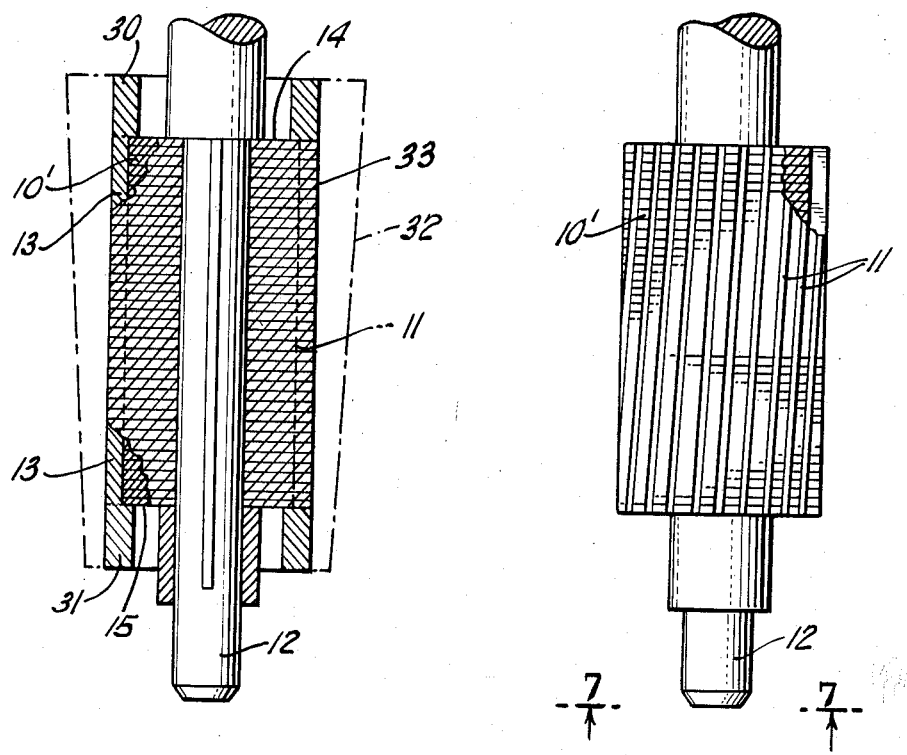
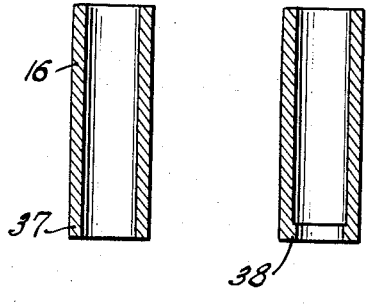
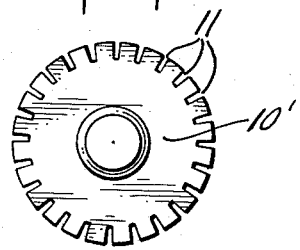
INVENTOR
WILLIAM C. HUGULEY
BY
ATTORNEY

United States Patent Office 3,093,888
Patented June 18, 1963

3,093,888
METHOD OF FABRICATING SMALL MOTOR ARMATURES
William C. Huguley, Belleville, N.J.
Filed Nov. 18, 1958, Ser. No. 774,738
9 Claims. (Cl. 29—155.53)

This invention relates to the art of fabricating small motors and particularly armatures for small servo motors and the like wherein the laminations are assembled on a central shaft with a plurality of very narrow slots extending radially inwardly in each lamination and axially along the periphery or circumference of the assembled laminations, the slots and ends of the armature to be filled with a suitable metal to define a "squirrel cage" armature. By virtue of the small size of such motors (for example, the armature of one size in use commercially is ⅜" in diameter and ¾" long) it has heretofore been extremely difficult to fill said slots and connect the ends. The procedures herein disclosed provide a means for now effectively and uniformly doing so consistently, on a practical production basis.

Such motors are popularly used in large quantities for civilian and military purposes; the invention fills a distinct need in the art and includes novel procedures hereinbelow set forth and exemplified in the accompanying illustrative drawings, it being understood that changes in the embodiments of the invention mentioned and shown may be made within the scope and purview of the invention and as recited in appended claims.

As shown in the drawings:

FIG. 1 is a fragmentary, vertical, sectional view of plunger and die members which may be used in carrying out the invention, showing the motor armature body initially positioned in the cavity of a mold, to receive the "squirrel cage" to be formed thereon, FIG. 2 is a similar view, showing the plunger moved into the mold cavity, FIG. 3 is an enlarged sectional view of an armature fabricated pursuant to the invention, FIG. 4 is a side elevational view of such armature, FIG. 5 is a longitudinal sectional view of a tube of metal to be positioned around the armature in the mold cavity to provide the "squirrel cage" metal pursuant to the invention, as shown in FIG. 1, FIG. 6 is a similar view of another form of tube, FIG. 7 is a transverse, sectional view taken on line 7—7 of FIG. 4 and FIG. 8 is a sectional view of a form of ring which may be used in addition to the tube.

Pursuant to the invention, the armature is fabricated with metal, pressed into the slots and rings formed on the ends of the bars that are formed in the slots to electrically connect the bars, of a purity, density and grain structure of commercially pure aluminum, aluminum alloys or ingots, for example, as produced in tubing or bar stock, or ingots.

A typical armature comprises, initially (FIGS. 1 and 3), a body member 10 formed of a plurality of laminations 10' (FIGS. 3, 4, 7) defining a plurality of slots 11 (FIGS. 4 and 7) into which metal heated to plastic form is to be pressed to form slot-filling bars 13 (FIG. 3) and end rings 30, 31 (as below more particularly described) which lie against the end walls 14, 15 of the rotor body 10, and connect the ends of the slot bars 13.

Pursuant to the invention, an aluminum tube 16 is used, which may be cut from commercial aluminum tubing or otherwise fabricated of a length greater than that of the armature body 10 and of a diameter enabling it to be readily slidably positioned thereover (FIG. 1) and is positioned therewith in the cavity 17 of a mold 18 said tube being heated by suitable means such as the induction coil 19 (FIG. 2). Suitable control and metering devices may be provided for heater coil 19 such as a thermocouple 20 positioned in a hole 21 in the mold 18. The latter may (FIG. 2) be formed of stepped sections 18a, 18b, 18c and 18d to allow for venting if desired. The tube and armature are heated on energizing the induction coil 19 to heat the tube 16 to the temperature required—around 1150° F. in the case of commercial aluminum tubing, to render said tube plastic but not fluid. If the tube were rendered fluid, bubbles might cause air pockets and other disadvantages might ensure—hence controls 20 are used to insure heating to plastic state. Pursuant to the invention, as below more particularly described, the cavity 17 of the mold 18 is closed on movement of the punch 22 which moves the plunger 23 and its compression guide sleeve 23a into the cavity 17 and then seats the under shoulder surface 29 against the top surface of mold 18.

Punch 22 is provided with an elongated co-axial recess 24 having a stepped portion 25 against which the enlarged head 26 of plunger 23 movable in recess 24 is normally urged by a spring 27. The plunger 23 is proportioned to pass inside the tube 16, the lower end of the plunger 23, formed as a shouldered head 28, abutting the end of the armature body 10 in initial movement of the punch 22 toward the mold 18. On continued movement of the punch 22 toward the mold 18, plunger 23 will retract in recess 24 of punch 22 and the shouldered lower end 29 of punch 22 closes the cavity 17 of the mold 18 so that as the tube 16 is heated, atmospheric air is excluded from the mold 18, preventing oxidation of the plastic material 16.

While the tube 16 is heated to plastic condition the plunger 23 continues to press thereon until the final seating of the shoulder 29 of punch 22 on the upper end face on the mold 18, at which time the plasticized tube 16 will have been pressed into the slots 12 and against the ends of the armature body 10, forming the slot filling bars 13, FIG. 3, and, unitarily therewith, the rings 30, 31 which lie against the ends of the body 10, to the initial contour or outline shown in dotted lines 32 in FIG. 3; the body member 10 may be subsequently machined to the original diameter 33 (FIG. 3) of the laminations 10' as the final contour. This last machining operation exposes the original lamination material 10' and aluminum bars 13 in the slots 11, with integral rings 30, 31 at both ends of the bars.

As above mentioned, the lower end 28 of the plunger 23 is formed as a shouldered neck abutting the end of the body member 10 initially on descent of punch 22 and for completion of the fabrication operation described, so that the heated and pressed material of the tube 16 will form the ring 30 at that end (14) of the armature body. The spring 27 operating on plunger 23 permits the latter to be held under initial tension while the punch 22 is moved toward the mold 18 (by any suitable mold actuating means which will be apparent to those skilled in this art). A stop pin 34 is frictionally or otherwise secured to the upper end of the recess 24 of the punch 22 and the spring 27 positioned there around. The parts are so proporqtioned (FIGS. 1 and 2) that the plunger 23 will be initially held by spring pressure against the end 14 of the armature body 10 and, when the end 29' of the shouldered portion 29 of the punch 22 completes its pressure cycle against tube 16 (preheated to plastic form) and the punch 22 abuts the mold 18 (FIG. 2) the spring 27 will be compressed and pin 34 will abut the plunger 23, preventing the latter from moving away from the armature body 10, so the compressed metal of sleeve 16 will be prevented from compressing on the shaft of the lamination assembly body 10.

The lower end of the cavity 17 of the mold 18 may be formed as a shouldered neck 35 (FIGS. 1 and 2) abutting the end 15 of the body 10 so that when the tube 16 is so heated to plastic condition and pressed, the ring 31 will be formed at said end 15 of the body 10.

Upon completion of the forming operation shown at FIG. 2, the punch 22 may be retracted from the mold 18 and the so-fabricated armature removed from the mold 18 as, for example, by an ejector pin 36. The shouldered neck 35 may, as shown, be formed as a part of ejector pin 36.

I have found that, by forming the lower half of the tube 16 of greater thickness than the upper half thereof, on heating said tube and so moving the plunger downward against the tube (as above mentioned), the excess of material thickness at the said lower end 37 (FIG. 6) of the so plasticized tube will cause the plasticized material at that end to press upwardly, equalizing the downward pressure forces. I have further found that the greater thickening of the lower end of the tube 16 for the purpose mentioned, need only be of a very slight order. The tube may be provided with an internally flanged lower end 38 (FIG. 7).

If desired, a ring 39 (FIGS. 1 and 8) made of the same material as the tube 16, may be provided, dimensioned to fit within the tube 16 and against the end 14 of the body member 10 prior to the fabrication step shown in FIG. 2. The shouldered end 28 of plunger 23 in such case would fit interiorly of ring 39 and against end 14 of body 10. Where the ring 39 is used, the lower end of the tube 16 may be made of greater area than the ring 39 to equalize the pressure forces in the fabrication step, as above outlined.

Instead of the metal mold as shown, a mold of non-metallic dielectric material may be used to enable the aluminum sleeve to be heated directly by the induction field instead of by heat conduction from the mold. The dielectric mold may be made of various materials, such as high temperature ceramics such as the aluminum oxides, or such as the high temperature "Pyrex" glasses.

Having thus described my invention, what I claim as new and desire to secure by Letters Patent is:

1. The method of fabricating a squirrel cage of longitudinal bars joined at their ends by end rings on a small motor armature body provided with a plurality of narrow axial peripheral slots and an elongated shaft extending axially through said body, in an apparatus provided with a mold having a cavity to freely receive the shaft and body and further provided with a punch member movable into the cavity to close the mold, said method comprising positioning said shaft and body into the cavity, with an elongated tube of aluminum of greater length than said body to concentrically surround said body in said cavity, heating the mold to thus heat the aluminum tube to plastic condition, with the tube still retaining its dimensional form, then moving the punch member under pressure against the tube in such original form and while maintaining the tube heated in said plastic condition, to thus press the plastic-conditioned tube hydraulically into the slots of the armature body and against the walls of the mold cavity to fill said slots and the mold cavity intermediate the punch member and the lower end of the cavity with said solid, close-grained unoxidized aluminum, to substantially encapsulate said body, then permitting the aluminum to cool on said body to form an integral slug with said body, then separating the punch from the mold and removing the so formed slug from the mold, then machining said slug to remove excess aluminum to leave and expose the metal forming the squirrel cage bars in each slot separated from each other and joined at their respective ends by end rings of the aluminum metal.

2. The method set forth in claim 1, including the further step of positioning an aluminum ring on the end of the armature at the outer end of the cavity in the mold, and heating said ring with said sleeve to plastic condition while retaining its original form on so heating the mold, the lower end of the punch being formed as a shouldered neck to thus press the so plasticized aluminum ring hydraulically between the shouldered end of the punch and the walls of the mold cavity to position some excess metal to be available to form a recessed end ring on the said end of the armature when the metal of the slug is machined to expose the separate bars and the rings.

3. The method set forth in claim 1, in which one end of the aluminum tube is formed of greater thickness than the remainder of the length thereof and the tube is positioned with its axis vertical as it concentrically surrounds said body, and with the said end thereof lowermost.

4. The method set forth in claim 3, in which said thicker end of the aluminum tube is formed with an inwardly directed flange that is positioned lowermost in the recess of the mold during the operation.

5. The method of fabricating a small motor armature having an armature body provided with a plurality of narrow axial slots on its periphery and an elongated shaft extending axially through said body, in a mold having a cavity to freely receive the shaft and body and with a punch member movable into the cavity to close the mold, said method comprising positioning an elongated cylindrical tube of metal of greater length than said body to encircle said body in said cavity, heating the mold to thus heat the tube to plastic condition while maintaining dimensional stability of the tube, then moving the punch member under pressure against the tube while maintaining the tube heated in said plastic condition, to thus press the tube while in such plastic state hydraulically into the slots of the armature body and against the walls of the mold cavity, filling said slots and mold cavity intermediate the punch member and the lower end of the cavity with close-grained unoxidized metal of said tube, then separating the punch from the mold and removing the so formed armature, then removing excess metal from the covered body to expose the metal in the slots as separate bars, with sufficient metal left at the ends to serve as end rings to join the bar ends.

6. The method set forth in claim 5, including the step of engaging opposite ends of the body portion while the tube is thus heated and pressed so that said tube while in such plastic state will so hydraulically fill said slots and will also position said excess metal for said later forming of recessed rings at the ends of the body portion by the removing operation.

7. The method of forming a squirrel cage on a laminated rotor assembly by compressing the metal of an aluminum sleeve into and around slots in the laminations of the assembly, which consists in disposing the aluminum sleeve concentrically around the lamination rotor assembly, heating the sleeve and the assembly until the sleeve becomes plastic in state but retains its original dimensional form, and then pressing the sleeve to fill the slots hydraulically in the laminations, and then removing excess metal to expose the slots and the metal therein as separate bars.

8. The method as in claim 7, in which the pressing step includes filling the slots in the laminations and positioning metal at the ends of the lamination assembly to join the metal in the slots, and then removing excess metal to expose the slots and the metal therein as separate bars, and leaving metal at the ends to serve as rings to join the bar ends.

9. The method as in claim 7, including the step of compressing the stacked assembly of laminations axially to close any spaces between the laminations, while pressing the sleeve to fill the slots in the laminations.

References Cited in the file of this patent

UNITED STATES PATENTS 930,868    Kearney _____ Aug. 10, 1909

(Other references on following page)

UNITED STATES PATENTS

| | | |
|---|---|---|
| 1,030,321 | Muller | June 25, 1912 |
| 2,012,021 | Petersen | Aug. 20, 1935 |
| 2,065,213 | Dolan et al. | Dec. 22, 1936 |
| 2,104,141 | Stevens | Jan. 4, 1938 |
| 2,151,874 | Simons | Mar. 28, 1939 |
| 2,248,167 | Elsey | July 8, 1941 |
| 2,449,365 | Bober et al. | Sept. 14, 1948 |
| 2,528,154 | Ludwig et al. | Oct. 31, 1950 |
| 2,998,683 | Mac Laren | Sept. 5, 1961 |

FOREIGN PATENTS

| | | |
|---|---|---|
| 872,239 | France | Feb. 5, 1942 |
| 146,696 | Great Britain | July 15, 1920 |